United States Patent

Masuzaki et al.

[11] Patent Number: 5,150,458
[45] Date of Patent: Sep. 22, 1992

[54] ELECTRONIC IMAGE INFORMATION FILING APPARATUS DISPLAYING EDITING CORRECTIONS

[75] Inventors: Hidefumi Masuzaki; Satoshi Ito, both of Odawara, Japan

[73] Assignee: Hitachi, Ltd., Tokyo, Japan

[21] Appl. No.: 271,289

[22] Filed: Nov. 15, 1988

[30] Foreign Application Priority Data

Nov. 16, 1987 [JP] Japan .................. 62-287302

[51] Int. Cl.$^5$ ............. G06F 15/62; G09G 1/16
[52] U.S. Cl. .................. 395/135; 395/146; 395/131; 340/720; 340/799
[58] Field of Search .......... 358/280, 295, 450, 452, 358/453; 364/521, 518, 523; 340/798, 799, 801, 720; 395/135, 146, 147, 131

[56] References Cited

U.S. PATENT DOCUMENTS

| | | | |
|---|---|---|---|
| 4,538,183 | 8/1985 | Kanno et al. | 358/280 |
| 4,667,248 | 5/1987 | Kanno | 358/280 |
| 4,695,966 | 9/1987 | Takakura et al. | 364/521 |
| 4,782,397 | 11/1988 | Kimoto | 358/256 |
| 4,827,330 | 5/1989 | Walsh et al. | 358/280 |

FOREIGN PATENT DOCUMENTS 62-26035 6/1987 Japan.

Primary Examiner—Gary V. Harkcom
Assistant Examiner—Raymond J. Bayerl
Attorney, Agent, or Firm—Fay, Sharpe, Beall, Fagan, Minnich & McKee

[57] ABSTRACT

Original image information is stored electronically in a storage memory device. The original image information is transferred to a first buffer memory when the image information is to be edited. The editing image information is input through a keyboard and character generator, for example, and stored in a second buffer memory. Thus, the original and editing information are stored separately from each other. An image display control device reads out and combines the original and editing image information from the first and second buffer memories, respectively, to provide combined or resultant image information. A display device receives the resultant image information and displays the original and editing information differently so that the editing image information can be distinguished from the original image information on the display device.

7 Claims, 6 Drawing Sheets

FIG. 4

|  | REG 1 (22) | REG 2 (23) | REG 3 (24) | REG 4 (25) |
|---|---|---|---|---|
| R - DATA | 1 | 1 | 0 | 1 |
| G - DATA | 1 | 0 | 0 | 0 |
| B - DATA | 1 | 0 | 0 | 0 |
| DISPLAY COLOR | WHITE | RED | BLACK | RED |

FIG. 5

| ORIGINAL IMAGE DATA | EDITING DATA | OUTPUT OF SELECTOR ||||  DISPLAY COLOR ON CRT |
|---|---|---|---|---|---|---|
| | | SELECTED REGISTER OUTPUT | R-DATA | G-DATA | B-DATA | |
| 0 | 0 | REG 1 (32) | 1 | 1 | 1 | WHITE |
| 0 | 1 | REG 2 (33) | 1 | 0 | 0 | RED |
| 1 | 0 | REG 3 (34) | 0 | 0 | 0 | BLACK |
| 1 | 1 | REG 4 (35) | 1 | 0 | 0 | RED |

FIG. 7

| | REG 1 (22) | REG 2 (23) | REG 3 (24) | REG 4 (25) |
|---|---|---|---|---|
| R - DATA | 1 | 1 | 0 | 0 |
| G - DATA | 1 | 1 | 0 | 0 |
| B - DATA | 1 | 1 | 0 | 0 |
| DISPLAY COLOR | WHITE | WHITE | BLACK | BLACK |

FIG. 8

| ORIGINAL IMAGE DATA | EDITING DATA | OUTPUT OF SELECTOR | | | | DISPLAY COLOR ON CRT |
|---|---|---|---|---|---|---|
| | | SELECTED REGISTER OUTPUT | R-DATA | G-DATA | B-DATA | |
| 0 | 0 | REG 1 | 1 | 1 | 1 | WHITE |
| 0 | 1 | REG 2 | 1 | 1 | 1 | WHITE |
| 1 | 0 | REG 3 | 0 | 0 | 0 | BLACK |
| 1 | 1 | REG 4 | 0 | 0 | 0 | BLACK |

ELECTRONIC IMAGE INFORMATION FILING APPARATUS DISPLAYING EDITING CORRECTIONS

BACKGROUND OF THE INVENTION

The present invention relates to an electronic filing apparatus which can store image information and can carry out editorial processing such as the retrieval, correction and writing of information, and more particularly to an electronic filing apparatus capable of showing what part of original image information has been edited and how this part has been edited.

An example of an electronic filing apparatus with a function of editing image information is disclosed in a Japanese patent application JP-B-62-26035 filed by Toshiba Corporation on Nov. 5, 1980 and laid open on May 17, 1982. In this example, image information is edited in such a manner that original image information is read out of a storage device, information such as a character and a sign is added to the read-out image information, and the modified image information thus obtained is stored in the storage device. In the editorial processing for carrying out such modification, part of the original image information is usually rewritten. Hence, when the modified image information is displayed on a display screen, it is impossible to know what part of the displayed information has been rewritten. Further, it is impossible to display the original image information prior to rewriting.

In the document processing of conventional paperwork, an original sentence or figure is usually modified in the following manner. That is, that part of the original sentence or figure which is to be modified, is erased, and modified information is written in the erased part. In some cases, the erased information and the modified information are both important to the writer of the original sentence, an editor and readers. In such cases, in order to be able to know both of the erased information and the modified information, original information is not erased but a slash or the like is written on the original information, and then new information is written in the vicinity of the original information. Further, in some cases, a red underline is given to a part of a sentence to clearly show that the part is important, or a comment is written in red color in a blank region of a document. That is, red display is used for showing that the underline and comment is information added to original information.

As mentioned above, in a case where the modification of a sentence and additional writing of information are carried out, it is important to show what part of resultant information has been modified or is additional information.

It is not considered by the electronic filing apparatus disclosed in the above-referred Japanese patent application, to show what part of resultant information has been modified or is additional information. Accordingly, when image information having been subjected to editorial processing is read out of the storage device and displayed on the display screen, it is impossible to know what part of the displayed information has been modified or is additional information.

SUMMARY OF THE INVENTION

It is an object of the present invention to provide an electronic filing apparatus which can modify an original image information and add new information thereto, and which can show what part of an image displayed by a display device has been modified or is additional information.

It is another object of the present invention to provide an electronic filing apparatus which can display image information on a display screen in colors, and which can correct original image information in red color and give a red underline to the original image information.

In order to attain the above objects, according to the present invention, there is provided an electronic filing apparatus which comprises a storage device for storing image information therein, a first buffer memory for reading out image information from the storage device and for storing read-out image information (namely, original image information) as first image information, a device for producing second image information usable for editing the first image information, a second buffer memory for storing the second image information therein, an image display control device for reading out the first and second image information from the first and second buffer memories, respectively, to deliver combined information of the first and second image information, and a display device applied with the output of the image display control device for displaying the output on a display screen.

In more detail, the original image information is temporarily stored in the first buffer memory. The addition of information or the modification of the original image information is not made in the first buffer memory, but editing image information added to the original image information or used for modifying the original image information is temporarily stored in the second buffer memory. The original image information from the first buffer memory and the editing image information from the second buffer memory are combined, to display a resultant image which is just like that obtained by editing the original image information, on the display screen of the display device. Further, when the resultant image is displayed on the display screen, the original image information and the editing image information are displayed in different colors, to discriminate therebetween. Thus, those portions of the resultant image where the original image information has been modified or new image information has been added to the original image information, can be readily found. Further, it is possible to correct a desired sentence in red color and to draw a red line underneath it.

The original image information stored temporarily in the first buffer memory and the additional image information stored temporarily in the second buffer memory are written into different regions of the storage device. Accordingly, the original image information and the editing image information can be separately read out of the storage device. That is, when the original image information and the editing image information have been stored in the storage device, an image due to only the original image information or an image due to only the additional image information (that is, an image indicative of only edited portions) can be selectively displayed on the display screen.

BRIEF DESCRIPTION OF THE DRAWINGS

FIG. 4 is a table for explaining a function of the color register of FIG. 3.

FIG. 5 is a table for explaining a function of the selector of FIG. 3.

FIG. 7 is a table for explaining another function of the color register of FIG. 3.

FIG. 8 is a table for explaining another function of the selector of FIG. 3.

DESCRIPTION OF THE PREFERRED EMBODIMENT

Figure 1:
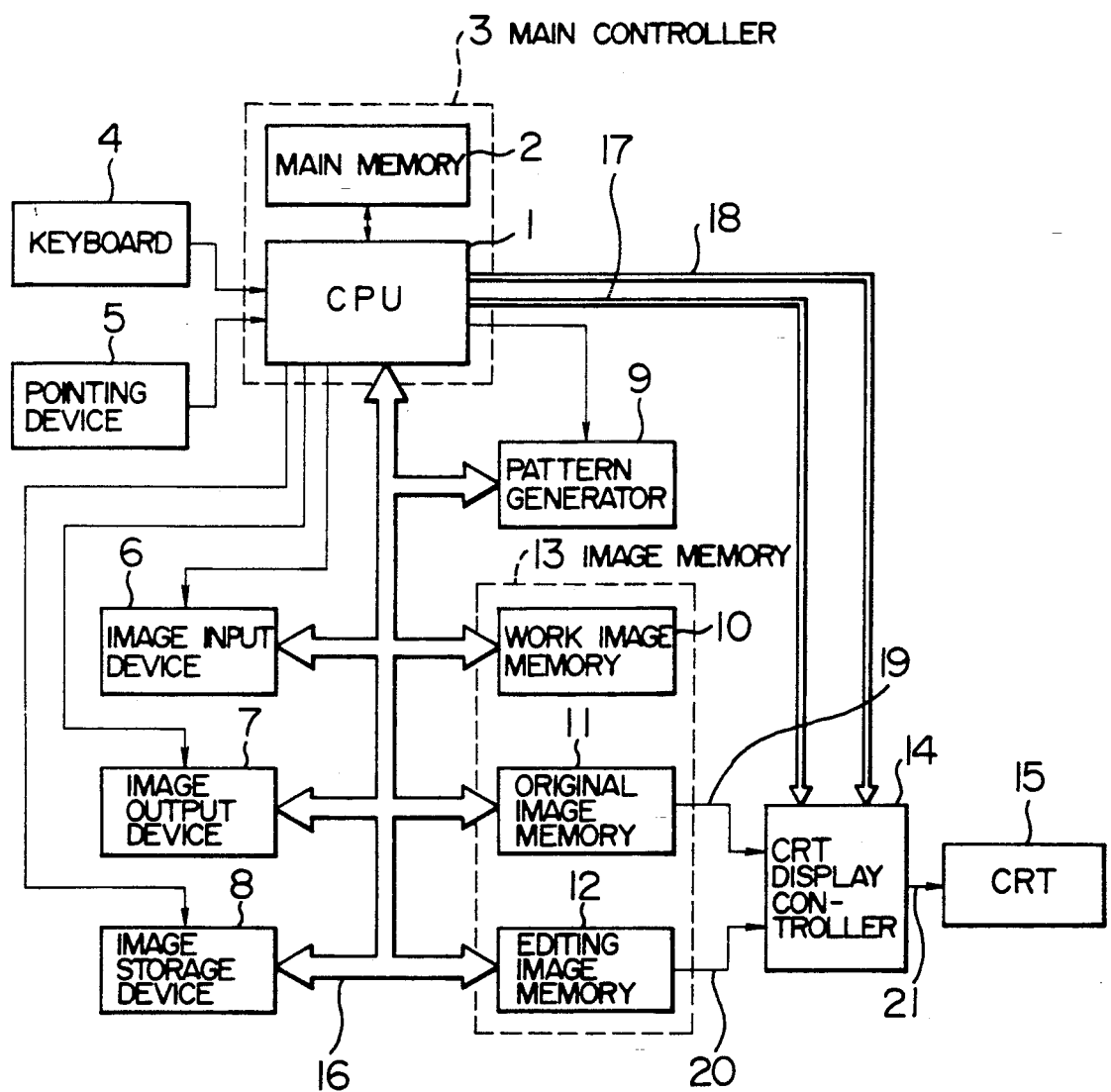
FIG. 1 is a block diagram showing an embodiment of an electronic filing apparatus according to the present invention.

FIG. 1 is a block diagram showing an embodiment of an electronic filing apparatus according to the present invention. Referring to FIG. 1, a main controller 3 includes a CPU 1 and a main memory 2 to manage the whole of the present embodiment. The CPU 1 is formed of a microprocessor and controls each part of the present embodiment. The main memory stores therein programs for operating the CPU 1, and is also used as a work area for operating the CPU 1. A keyboard 4 is used by an operator, to operate the present embodiment. A pointing device 5 is a mouse, a joystick, or the like, and is used for specifying the position of a cursor which is displayed on the display screen of a CRT display 15. An image input device 6 is an image scanner (or the like) for two dimensionally scanning an input manuscript and for converting a received image into an electric signal to obtain two-dimensional image information. The two-dimensional image information from the image input device 6 is given in such a manner that each pixel has a logical value "1" or "0", that is, each pixel is one of black and white pixels. In other words, the two-dimensional image information is binary data, that is, monochromatic image information. An image output device 7 is an image printer such as a laser beam printer (LBP), and delivers image information which is supplied from an image data bus 16, in the form of a hard copy. An image storage device 8 is a memory device such as a magnetic disk or an optical disk, and stores image information supplied from the image data bus 16. A desired piece of the image information stored in the image storage device 8 can be fetched, under the control of the main controller 3, to the image data bus 16. An image memory 13 is made up of a word image memory 10, an original image memory 11 and an editing image memory 12, and temporarily stores image information supplied from the image data bus 16. Each of the memories 10 to 12 can store image information corresponding to one frame which is displayed by the CRT display 15. The work image memory 10 is used as a work area for combining the image information from the original image memory 11 and the image information from the editing image memory 12 so that desired image information can be delivered from the image output device 7. The original image memory 11 stores therein original image information. The editing image memory 12 stores therein additional image information given to the original image information or used for modifying the original image information (hereinafter referred to as "editing data"). Each of the original image memory 11 and the editing image memory 12 stores monochromatic image information, in which each pixel is expressed in a black or white color, that is, by binary data having a logical value "1" or "0". A pattern generator 9 generates patterns such as a character, a symbol, a straight line and a curved line. These patterns are written in the editing image memory 12 of the image memory 13 through the image data bus 16.

A CRT display controller 14 controls the color display of a desired combination of various image information. In more detail, the display controller 14 receives a color register control signal group from the main controller 3, and reads out original image data 19 and editing data 20 from the original image memory 11 and the editing image memory 12, respectively, at the same time in such a manner that the original image data 19 and the editing data are read out at each pixel. Each of the original image data 19 and the editing data 20 is binary data of the bit serial type. The original image data 19 and the editing data 20 are combined so as to form the resultant data, and the resultant data is expressed by three signals indicative of red (R), green (G) and blue (B), to obtain display image data 21. The CRT display controller 14 also receives a cursor control signal group from the main controller 3, to superpose cursor image data on the display image data 21. Thus, a cursor can be displayed at a desired position on the display screen of the CRT display 15.

The CRT display 15 is, for example, a color CRT display, and receives the display image data 21 to display an image which is obtained by combining the monochromatic image information from the original image memory 11 and the monochromatic image information from the editing image memory 12, on a display screen in color.

Figure 2:
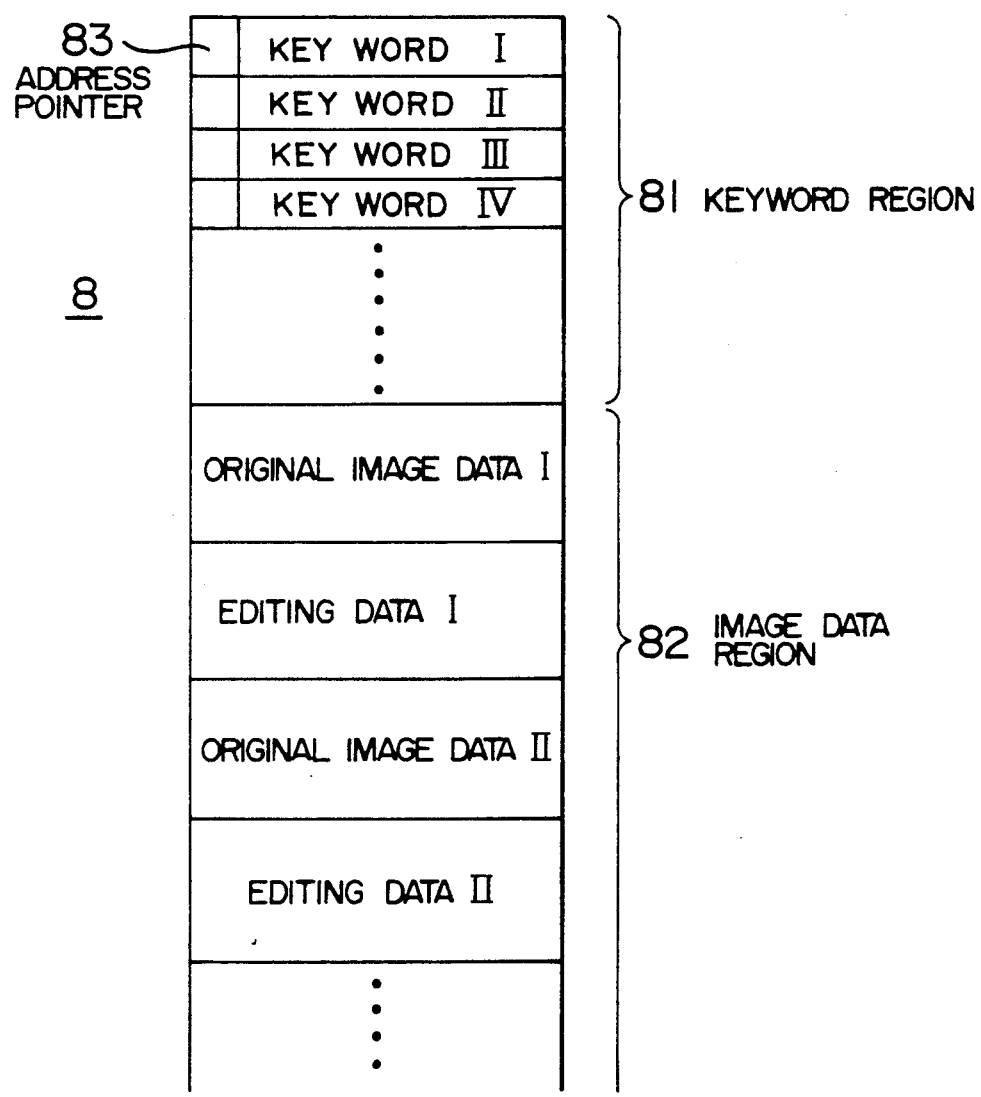
FIG. 2 is a schematic diagram showing memory areas of the image storage device of FIG. 1.

FIG. 2 shows how the data storing region of the image storage device 8 is divided. The data storing region is roughly divided into a key word region 81 and an image data region 82. The key word region 81 stores therein key word data which indicates titles of image data and is used for reading out the image data. Each row of the key word region 81 has an address pointer 83 at the head thereof, to show the address of image data specified by a key word. This image data is stored in the image data region 82 at the address specified by the address pointer 83. Original image data and editing data corresponding to one frame of the CRT display 15 are stored, in pairs, in the image data region 82. Accordingly, the original image data and the editing data can be separately read out of the image storage device 8.

Next, the circuit configuration of the CRT display controller 14 will be explained in detail, with reference to FIG. 3.

Figure 3:
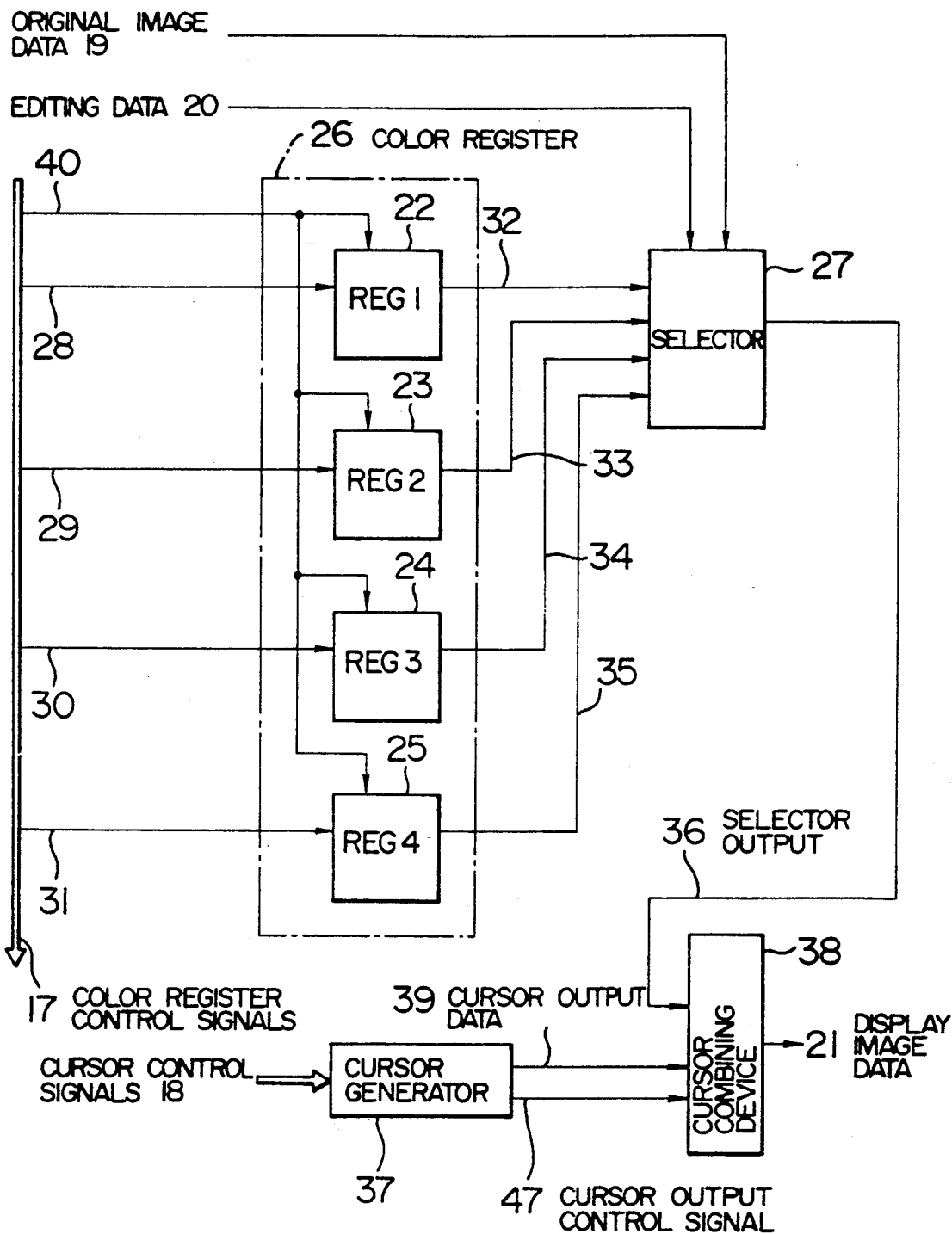
FIG. 3 is a block diagram showing the circuit configuration of the CRT display controller of FIG. 1 in detail.

FIG. 3 is a block diagram showing the circuit configuration of the CRT display controller 14. Referring to FIG. 3, a color register 26 includes registers 22 to 25. Each of the registers 22 to 25 holds 3-bit data indicative of red, green and blue. A selector 27 selects one of the output signals from the registers 22 to 25, in accordance with the presence or absence of each of the original image data 19 and the editing data 20. A cursor generator 37 generates a signal for displaying a cursor at a desired position on the display screen of the CRT display 15. A cursor combining device 38 combines an output signal 36 from the selector 27 and cursor output data 39 from the cursor generator 37, that is, combines image information and cursor information to obtain resultant data.

Next, the operation of the CRT controller 14 will be explained. Data set in the color register is given from the main controller 3 by a color register control signal group 17. The color register control signal group 17 includes a register set signal 40 and register input signals 28 to 31. Each of the register input signals 28 to 31 is sent by three signal lines for indicating red, green and blue (namely, RGB). The main controller 3 gives RGB data which is to be set in each of the registers 22 to 25, to a corresponding one of the register input signals 28 to 31, and also delivers the register set signal 40. Thus, desired RGB data can be set in the registers 22 to 25.

FIG. 4 is a logical table which shows RGB data set in the registers 22 to 25. Referring to FIG. 4, RGB data set in the register 22 corresponds to white display, RGB data set in the registers 23 and 25 corresponds to red display, and RGB data set in the register 24 corresponds to black display.

Referring back to FIG. 3, register output signals 32, 33, 34 and 35 are sent out from the registers 22, 23, 24 and 25, respectively. Each of the register output signals 32 to 35 is sent out by three signal lines indicative of RGB data. The selector 27 selects one of the register output signals 32 to 35 applied thereto, in accordance with the presence or absence of each of the original image data 19 and the editing data 20, and delivers the selected register output signal. An output signal 36 from the selector 27 is sent out by three signal lines for indicating RGB data.

Now, the operation of the selector 27 will be explained, with reference to FIG. 5. FIG. 5 is a table showing a function of the selector 27. In FIG. 5, the logical value of original image data equal to "0" indicates that original image information specifies a white image, and the logical value of original image data equal to "1" indicates that original image information specifies a black image. Further, the logical value of editing data equal to "0" indicates that a pixel corresponding to editing data is a white or unedited pixel. In a case where both of the original image data 19 and the editing data 20 have a logical value "0", the register output signal 32 of the register 22 is used as the selector output signal 36, and hence the display color on the display screen of the CRT display 15 is white. Further, the selector 27 selects one of the registers 23 to 25 in accordance with the logical values of the original image data 19 and the editing data 20 as shown in FIG. 5, to determine the display color on the display screen.

Referring back to FIG. 3, the output signal 36 of the selector 27 is applied to the cursor combining device 38. Cursor display position information and cursor display color information are supplied from the main controller to the cursor generator 37 by a cursor control signal group 18. The cursor generator 37 puts a cursor output control signal 47 at an ON-level and delivers R-, G- and B-signals corresponding to a display color, as cursor output data 39, in accordance with a command from the main controller 3. The cursor combining device 38 is controlled by the cursor output control signal 47. When the cursor output control signal 47 is put at the ON-level, the cursor output data 39 is delivered, as display image data 21, from the cursor combining device 38. When the cursor output control signal 47 is put at an OFF-level, the output signal 36 of the selector 27 is delivered, as the display image data 21, from the cursor combining device 38. The display image data 21 is sent out from the device 38 by three signal lines for indicating RGB data.

As is evident from the above explanation, the original image information in the original image memory 11 is displayed on the display screen of the CRT display 15 so that a black image is formed on a white background, on the basis of the operations of the color register 26 and the selector 27. Further, the editing image information in the editing image memory 12 is displayed as a red image on the white back ground. The red image thus obtained is combined with the black original image, to obtain the resultant image. Further, in a case where both of the original image data 19 and the editing data 20 have a logical value "1", the display color on the display screen is red as shown in FIG. 5. In other words, in a case where the original image data 19 displayed by a black image and the editing image information 20 displayed by a red image are both present at one pixel, the editing image information is preferentially displayed.

In the above, the whole construction of the present embodiment has been explained. Next, explanation will be made of not only the steps of procedure for carrying out correctional processing in the present embodiment in such a manner that correction is indicated by red color and both of an original image and an image used for correction are displayed, but also the operation of each part of the present embodiment in the correctional processing, with reference to FIGS. 6A to 6F.

Each of FIGS. 6A to 6F shows data used for carrying out correctional processing in red color (that is, original image data stored in the original image memory 11 and editing data stored in the editing image memory), and an image displayed by the CRT display 15 in a step of the correctional processing. Now, explanation will be made of the steps of procedure for correcting original image data which is read out of the image storage device 8 on the basis of a search operation, in red color, and for storing the corrected information in the image storage device 8.

Figure 6:
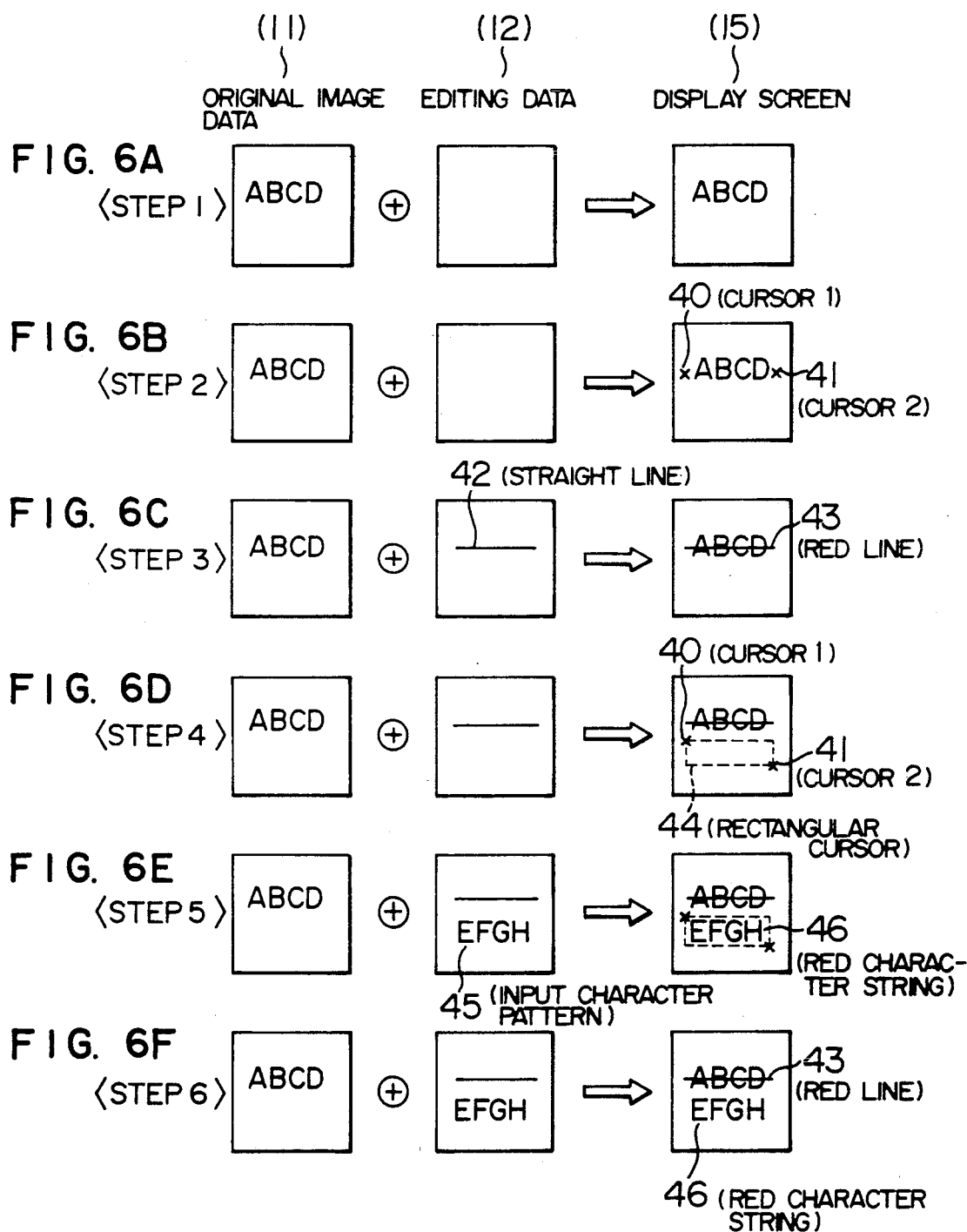
FIGS. 6A to 6F are diagrams for explaining the steps of procedure which are used for correcting an image in red color in accordance with the present invention.

<Step 1> An operator operates the keyboard 4 so that the present system is put in an image retrieval mode. Next, the index information (KEY WORD) of a desired image is inputted by means of the keyboard 4, and a read operation is specified by the keyboard 4. Then, the original image data of the desired image is fetched from the image storage device 8 into the original image memory 11. In this case, editorial processing is not yet carried out, and hence editing data in the editing image memory 12 indicates a blank image (that is, white image), as shown in FIG. 6A.

<Step 2> The operator operates the keyboard 4 so that the present embodiment is put in an image modification mode. Next, a straight-line drawing command is given by the keyboard 4, and the pointing device 5 is operated so that a cursor 40 is located at the left end of an area where a straight line is to be drawn and another cursor 41 is located at the right end of the area, as shown in FIG. 6B.

<Step 3> A processing executing command is given by the keyboard 4. Then, the main controller 3 calculates the positive coordinates of both ends of a straight line specified by the cursors 40 and 41, and instructs the pattern generator 9 to generate a straight line in accordance with the above position coordinates. The pattern generator 9 generates the straight line as editing image information. Then, a straight-line image 42 is written in the editing image memory 12, and that portion of the display screen of the CRT display 15 which corresponds to the straight-line image 42, becomes red, that is, a red straight line 43 is displayed on the display screen, as shown in FIG. 6C.

<Step 4> Next, an operation for inputting a character string which is used for correcting original image, with the aid of the keyboard 4 is started. Prior to the inputting of the character string, the pointing device 5 is operated so that the cursor 40 is located at the upper left corner of an area where the character string is to be arranged, and the cursor 41 is located at the lower right corner of the area. After the cursor 41 has been set in a state that the character string is specified, a rectangular cursor 44 defined by the cursors 40 and 41 is displayed on the display screen, as shown in FIG. 6D.

<Step 5> Next, the character string ("EFGH") which is used for correcting the original image, is inputted by the operator with the aid of the keyboard 4. Then, the main controller 3 calculates position coordinates of the rectangular area defined by the cursors 40 and 41, and issues a character-string write instruction to the pattern generator 9. The pattern generator 9 generates a specified character-string pattern, which is written in the editing image memory 12. Thus, an input character pattern 45 is written in the editing image memory 12, and a red character pattern 46 corresponding to the input character pattern 45 is displayed on the display screen of the CRT display 15, as shown in FIG. 6E.

<Step 6> When it is indicated by means of the keyboard 4 that the character-string input operation has been completed, the rectangular cursor 44 disappears from the display screen. That is, as shown in FIG. 6F, a character string "ABCD" due to the original image information is crossed out by the red straight line 43, and a red character string "EFGH" is displayed under the character string "ABCD". Thus, the correctional processing in red color is completed.

<Step 7> When the registration of editing image is indicated by means of the keyboard 4, the editing data in the editing image memory 12 is transferred to an editing data area of the image data region 82 of the image storage device 8, to be stored in the editing data area. While, the original image information in the original image memory 11 is not modified at all. Accordingly, it is not required to write the above original image information again in an original image data area of the image data region 82.

<Step 8> When the present embodiment is again put in the image retrieval mode and an image-information read operation is indicated after the correctional processing in the steps 1 to 7 has been carried out, images obtained after the correctional processing, that is, the original image data and the editing image data are read out of the image storage device, and are stored in the original image memory 11 and the editing image memory 12, respectively. In this case, the original image data, the editing image data and the image displayed on the display screen of the CRT display 15 are identical with those in the step 6.

<Step 9> When the displaying of editing image data is stopped on the basis of an indication from the keyboard 4, only the original image data is displayed on the display screen of the CRT display 15. Accordingly, even when any additional information or any modification is given to the original image information in the steps 1 to 7, the original image information can be ascertained.

Now, a method of stopping the display of an editing image data will be explained below. The editing image data display can be readily stopped by updating the contents of the color register 26 shown in FIG. 3. FIG. 7 shows the contents of the color register 26 for stopping the display of an editing image, and FIG. 8 shows the function of the selector 27 for the above purpose. In this case, the display color on the display screen of the CRT display 15 is determined only by the original image data. Alternatively, only the editing data can be displayed on the display screen by changing the contents of the color register 26. Further, each of the original image information and the editing image information can be displayed on the display screen in a color other than the above-mentioned color.

<Step 10> In the above-mentioned correctional processing, editing data is added with image data and graphic pattern data. In some cases, however, it is required to correct or erase the editing data, or to further add new data to the original image information. In such cases, the pattern generator 9 is caused to generate a blank image (that is, white image), and the blank image is written in the editing image memory 12, to clear the whole or a part of the editing image memory 12. Then, the correctional processing is carried out in the same manner as in the steps 2 to 7.

The correctional processing in red color can be carried out in accordance with the above-mentioned steps. When the cursors 40 and 41 are located under the original character string "ABCD" in the step 2, a red underline is formed by the straight-line drawing operation in step 3. When only the processing in the steps 4 to 6 is carried out, a red character string is added to the original image information. Further, image information inputted by the image device 6, or image information read out of the image storage device 8 can be stored, as editing data, in the edit image memory 12.

Next, explanation will be made of the operation of the present embodiment which is performed when an image displayed by the CRT display 15 is printed out by the image output device 7. In the present embodiment, the image displayed by the CRT display 15 is formed on the basis of the original image data and the editing data. Accordingly, in order to send the display image to the image output device 7 for delivering a monochromatic image, it is necessary to combine the original image data and the editing data.

In the present embodiment, this combinational processing is carried out by the main controller 3. The main controller 3 reads out the original image data and the editing data from the original image memory 11 and the editing image memory 12, respectively, and performs an OR operation for the original image data and the editing data. The image information thus obtained is stored in the work image memory 10. Next, the image information in the work image memory 10 is outputted to the image output device 7 on the basis of a command from the main controller 3. Further, in the present embodiment, it is possible to take out only one of the original image data and the editing data in accordance with an indication from the keyboard 4. In this case, only one of the original image data in the original image memory 11 and the editing data in the editing image memory 12 is outputted from the image output device 7.

As has been explained in the above, according to the present embodiment, document processing such as correctional processing in red color, addition of a red underline, and addition of a red character string can be readily carried out. Further, data used for correction or added to original image data are treated as editing data, without modifying the original image data, and moreover the editing data and the original image data are separately stored in the image storage device 8. Accordingly, it is possible to ascertain the original image data and the editing data independently of each other.

Although an embodiment of an electronic filing apparatus according to the present invention has been explained in the above, various changes and modifications can be made as will be mentioned blow, without departing from the spirit of the present invention.

(1) For example, the CRT display 15 may be formed of a monochromatic CRT display, though a color CRT display is used as the CRT display 15 in the present embodiment. In this case, only the G-signal of the R-, G- and B-signals for indicating display image data is applied to the monochromatic CRT display. As is apparent from the G-data column of FIG. 5 which shows the function of the selector 27, in a case where both of the original image data and the editing data have a logical value "0", the signal applied to the monocrymatic CRT display takes a level "1", that is, a display color is white. Further, in three cases (that is, a case where the original image data has the logical value "0" and the editing data has a logical value "1", a case where the original image data has the logical value "1" and the editing data has the logical value "0", and a case where both of the original image data and the editing data has the logical value "1"), the signal applied to the monochromatic CRT display takes a level "0", that is, the display color is black. In other words, the logical sum of the original image data and the editing data is displayed on the display screen of the monochromatic CRT display. Now, let us change the contents of the registers 22 to 25 as shown in FIG. 7. Then, as shown in the G-data column of FIG. 8, in a case where the original image data has the logical value "0", the signal applied to the monochromatic CRT display takes the level "1", that is, the display color is white. In a case where the original image data has the logical value "1", the signal applied to the monochromatic CRT display takes the level "0", that is, the display color is black. In other words, only the original image data is displayed on the display screen of the monochromatic CRT display. Further, only the editing data can be displayed on the display screen by changing the contents of the registers 22 to 25.

(2) In a case where the combined data of the original image data and the editing data is displayed by the monochromatic CRT display, it is possible to discriminate between the original image data and the editing data, as mentioned below. That is, a display image due to the editing data is made different in brightness from a display image due to the original image data, the turnover indication is used only for the editing data, a halftone screen is used only for the editing data, or a blinking operation is performed only for the editing data. In order to carry out brightness modulation at the monochromatic CRT display, the monochromatic CRT display is applied with, for example, only R- and G-data of the display image data 21, and is operated so that low brightness (that is, black display) is obtained when both of the R- and G-data have a logical value "1", ordinary brightness (that is, white display) is obtained when both of the R- and G-data have a logical value "0", and high brightness (that is, light, white display) is obtained when the R-data has the logical value "1" and the G-data has the logical value "0".

As is evident from the foregoing explanation, according to the present invention, correctional processing for image information, addition of an underline, addition of a sentence, deletion of a sentence, and others can be readily made in an electronic filing apparatus. Further, it is quite obvious what part of an original image has been modified or supplied with additional information, and moreover the original image data and an editing data can be ascertained independently of each other.

We claim:

1. An electronic image information filing apparatus for displaying first and second image information, comprising:

storage means for storing said image information;

processing means connected to said storage means;

first memory means connected to said processing means for storing said first image information in binary pixel data from read out from said storage means by said processing means;

means for inputting and using said second image information for editing the first image information;

second memory means for storing said second image information in binary pixel data form;

image display control means for reading out said first and second image information from said first and second memories under control of said processing means, respectively, and for combining said first and second image information pixel by pixel to form resultant display image data wherein each of said first and second image information has a different display status, said image display control means combining said first and second image information while simultaneously reading out said first and second image information from said first and second memories, respectively;

display means for receiving and displaying said resultant display image data, including displaying each of said first and second image information according to its respective different display status; and said image display control means further comprising selector means for selectively outputting one of said first and second image information in preference over the other when both said first and second image information are present at one pixel.

2. An electronic image information filing apparatus according to claim 1, wherein said image display control means changes a displayed color of said second image information from a displayed color of said first image information.

3. An electronic image information filing apparatus according to claim 1, wherein said image display control means changes a displayed brightness of said second image information from a displayed brightness of said first image information.

4. An electronic image information filing apparatus according to claim 1, wherein said means for inputting and using said second image information is an input device connected to means for generating a pattern, including a character, a numeral, a figure and a sign.

5. An electronic image information filing apparatus according to claim 4, wherein said first and second image information is stored separately in different regions of said storage means so that each of said first and second image information can be separately read out from said storage means.

6. An electronic image information filing apparatus for displaying first and second image information, comprising:

storage means for storing said image information;
processing means connected to said storage means;
first memory means connected to said processing means for storing said first image information in binary pixel data form read out from said storage means by said processing means;
means for inputting and using said second image information for editing the first image information;
second memory means for storing said second image information in binary pixel data form;
image display control means for reading out said first and second image information from said first and second memories under control of said processing means, respectively, and for combining said first and second image information pixel by pixel to form resultant display image data wherein each of said first and second image information has a different display status;
display means for receiving and displaying said resultant display image data, including displaying each of said first and second image information according to its respective different display status; and
said image display control means including selector means receiving as data-select inputs each of said first and second image information as binary pixel data, and receiving as data inputs the outputs of a color register, said selector means being further for providing an output to said display means in accordance with a combination of the data-select inputs and for providing as said output said second image information pixel data when both said first and second image information data are present at one pixel.

7. An editing method for an electronic image information filing apparatus having a storage device, display device, and first and second memories, comprising the steps of:
storing original image information in said storage device as binary pixel data;
reading said original image information from said storage device and storing said original image information in said first memory as binary pixel data;
inputting editing image information in order to edit said original image information;
storing said editing image information in said second memory as binary pixel data;
combining said original and said editing image information pixel by pixel to form resultant display image data wherein each of said original and editing image information has a different display status;
displaying said resultant display image data with said display device, including displaying each of said original and editing image information with each said different display status, respectively;
storing said editing image information in said storage device separately from said original image information, wherein:
said combining step further includes providing a selector receiving as data-select inputs each of said original and editing image information as binary pixel data, and receiving as data inputs the outputs of a color register, and providing an output to said display means with said selector in accordance with a combination of the data-select inputs and further providing as said output said editing image information pixel data in preference over said original image information pixel data when both said original and editing image information are present at one pixel.

* * * * *